Feb. 26, 1929.

J. SCHULTHEISS 1,703,548

PIPE CUTTER

Filed April 10, 1928

INVENTOR
John Schultheiss
BY
ATTORNEY

Patented Feb. 26, 1929.

1,703,548

UNITED STATES PATENT OFFICE.

JOHN SCHULTHEISS, OF BALTIMORE, MARYLAND.

PIPE CUTTER.

Application filed April 10, 1928. Serial No. 269,007.

This invention relates to improvements in pipe cutters and has for its object to provide a simple and efficient device which may be adjusted for the purpose of cutting pipes for various diameters.

The invention consists of the novel construction and arrangement of the parts and combination of the parts hereinafter more fully set forth in the following specifications and pointed out in detail in the appended claims.

Figure 1:
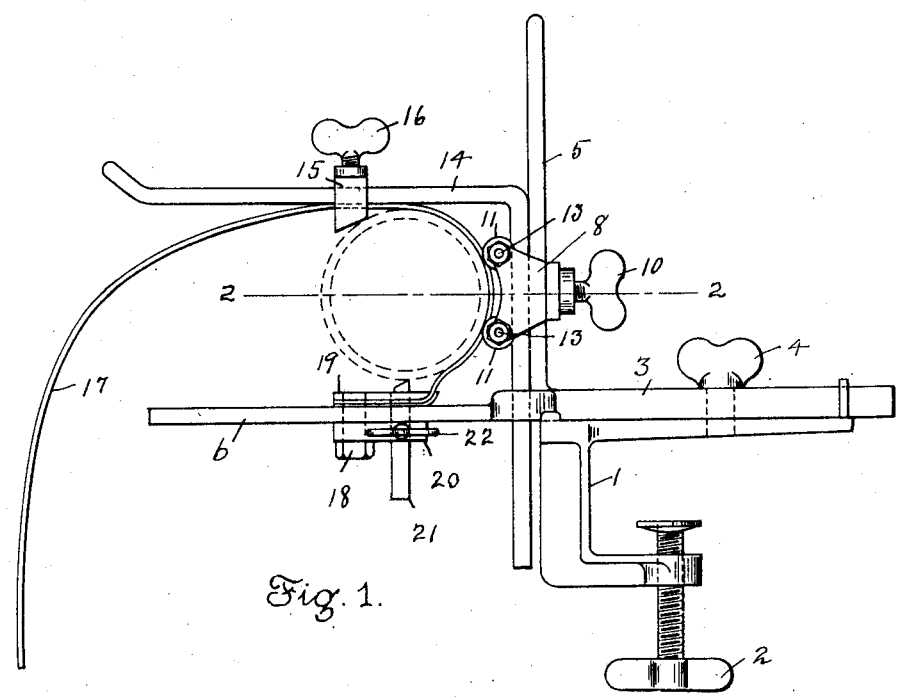
Figure 1 is a side elevation of my invention.
Figure 2:
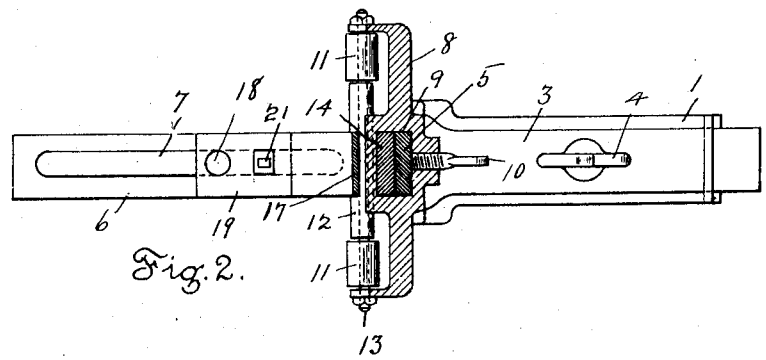
Figure 2 is a section on the line 2—2 of Figure 1.

Referring to the accompanying drawing forming part of this specification and in which like reference numerals designate like parts throughout the several views thereof, 1 designates a clamp which is held in any suitable position by the thumb screw 2. On the upper surface of the clamp 1 is a base piece 3 which slides upon the said clamp 1 and is held in the adjusted position by the thumb screw 4. The said base piece 3 is provided with the upright 5 and the extension 6 which latter is provided with an elongated slot 7. The adjustable bearing 8 is provided with an aperture 9 through which the upright 5 projects, the said bearing 8 being adjusted vertically on said upright 5 and is held in the adjusted position by the thumb screw 10. The said bearing 8 carries two sets of rollers 11 and 12, which are mounted on the shafts 13. The angular arm 14 has one angle projecting down through the opening 9 in the bearing 8 and impinges against the upright 5 and is held in the adjusted position by the thumb screw 10. The other angle of the angular arm 14 projects over the piece 6 and has an adjustable clamp 15 held thereon by the thumb screw 16, and through which the flexible band 17 passes, the opposite end of the said flexible band is provided with an aperture through which the bolt 18 passes. The said bolt 18 passes through the end of the flexible band 17 into the plate 19, said bolt 18 being adjustable along the slot 7. Beneath the extension 6 is a block 20 which is also held in position by the screw 18 and is provided with an aperture through which the cutting tool 21 passes, the said tool 21 also projects up through the plate 19 and is held in the proper position by the thumb screw 22.

It will thus be seen that the angular arm 14 can be raised or lowered and the block 20 moved back and forth on the extension 6 to accommodate various sizes of pipe to be cut. The band 17 can also be adjusted by the thumb screw 16. The pipe when in position rests against the band 17 and against the rollers 11 permitting it to be revolved on the cutting blade 21.

Having thus described my invention what I claim is:

1. A base having a clamp at one end and a projection at one end, an upright, and an angle arm adjusted on said upright, and a cutting tool adjusted along said projection.

2. A base having a clamp at one end, and an elongated slot in the opposite end and an integral upright near one end of said elongated slot, an angle arm adjusted on said upright, a block adjusted along said elongated slot and a cutting tool carried by said block.

3. A pipe cutter comprising a base having a clamp at one end, an elongated slot in its opposite end and an integral upright near one end of said elongated slot, a bearing adjusted on said upright, an angle arm having one angle projecting through said bearing, a clamp adjusted along the other arm of the said angle arm, a block adjusted in said elongated slot, a flexible band secured at one end to said block and projecting through the clamp on said angle arm and a cutting tool carried by said block.

In testimony whereof I affix my signature.

JOHN SCHULTHEISS.